United States Patent
Sumitomo et al.

(10) Patent No.: US 7,031,544 B2
(45) Date of Patent: Apr. 18, 2006

(54) IMAGE RESTORATION APPARATUS

(75) Inventors: Hironori Sumitomo, Moriguchi (JP); Mutsuhiro Yamanaka, Suita (JP)

(73) Assignee: Minolta Co., Ltd., Osaka (JP)

( * ) Notice: Subject to any disclaimer, the term of this patent is extended or adjusted under 35 U.S.C. 154(b) by 604 days.

(21) Appl. No.: 10/108,135

(22) Filed: Mar. 27, 2002

(65) Prior Publication Data

US 2002/0168115 A1 Nov. 14, 2002

(30) Foreign Application Priority Data

Mar. 30, 2001 (JP) ........................................ 2001-098149

(51) Int. Cl.
*G06K 9/40* (2006.01)

(52) U.S. Cl. ........................ 382/254; 382/260; 382/275; 348/221.1

(58) Field of Classification Search .................. 382/254, 382/260, 266, 275, 305, 312, 255; 348/221.1, 348/208.4, 208.5; 355/52, 71; 358/3.26, 532
See application file for complete search history.

(56) References Cited

U.S. PATENT DOCUMENTS

| | | | | |
|---|---|---|---|---|
| 4,914,746 A | * | 4/1990 | Nishi et al. | |
| 5,627,918 A | * | 5/1997 | Carasso | 382/254 |
| 5,781,806 A | * | 7/1998 | Satoh et al. | 396/55 |
| 5,790,709 A | * | 8/1998 | Kopeika et al. | 382/254 |
| 6,154,574 A | * | 11/2000 | Paik et al. | 382/255 |
| 6,424,372 B1 | * | 7/2002 | Kaneda et al. | 348/207.99 |
| 6,822,758 B1 | * | 11/2004 | Morino | 358/1.9 |

FOREIGN PATENT DOCUMENTS

JP 06-054172 A 2/1994

OTHER PUBLICATIONS

M. Elad et al., "Super-Resolution Restoration of An Image Sequence—Adaptive Filtering Approach", *Technion–Israel Institute of Technology*, Apr. 4, 1997, 24 pages.

* cited by examiner

Primary Examiner—Kanjibhai Patel
(74) Attorney, Agent, or Firm—Sidley Austin LLP (57) ABSTRACT

A shot image degraded by an asymmetric degrading filter is corrected, the corrected shot image is modified into an updated image, the updated image is degraded by use of the degradation function obtained at the time of shooting, and the residual between the degraded modified image and the shot image is calculated. Then, with the modified image as a new image to be processed, the image modification and update, the image degradation and the residual calculation are iterated until the calculated residual is smaller than a predetermined threshold value. When the residual is smaller than the predetermined threshold value, the corresponding updated image is used as the restored image.

10 Claims, 7 Drawing Sheets

| 0 | 1/8 | 0 |
|---|-----|---|
| 1/8 | 1/2 | 1/8 |
| 0 | 1/8 | 0 |

Fig. 6(B)

| 0 | 0 | 0 | 0 | 0 |
|---|---|---|---|---|
| 0 | 0 | 0 | 0 | 0 |
| 0 | 0 | 1/3 | 1/3 | 1/3 |
| 0 | 0 | 0 | 0 | 0 |
| 0 | 0 | 0 | 0 | 0 |

Fig. 6(C)

| 1/4 | 1/4 | 0 |
|-----|-----|---|
| 1/4 | 1/4 | 0 |
| 0 | 0 | 0 |

| 0 | 0 | 0 | 0 | 0 | 255 | 255 | 255 | 255 | 255 |
|---|---|---|---|---|-----|-----|-----|-----|-----|
| 0 | 0 | 0 | 0 | 0 | 255 | 255 | 255 | 255 | 255 |
| 0 | 0 | 0 | 0 | 0 | 255 | 255 | 255 | 255 | 255 |
| 0 | 0 | 0 | 0 | 0 | 255 | 255 | 255 | 255 | 255 |
| 0 | 0 | 0 | 0 | 0 | 255 | 255 | 255 | 255 | 255 |

| 0 | 0 | 32 | 64 | 255 | 255 |
|---|---|----|----|-----|-----|

Fig. 7(D)

| 0 | 85 | 170 | 255 | 255 | 255 |
|---|----|-----|-----|-----|-----|

Fig. 7(E)

| 0 | 0 | 85 | 170 | 255 | 255 |
|---|---|----|-----|-----|-----|

Fig. 7(F)

| 0 | 0 | 0 | 128 | 255 | 255 |
|---|---|---|-----|-----|-----|

Fig. 7(G)

| 0 | 0 | 64 | 192 | 255 | 255 |
|---|---|----|-----|-----|-----|

IMAGE RESTORATION APPARATUS

This application is based on the application No. 2001-98149 filed in Japan, the content of which is hereby incorporated by reference.

BACKGROUND OF THE INVENTION

1. Field of the Invention

The present invention relates to an image restoration apparatus that obtains information on the degradation caused in an image shot by a digital camera or the like, that is, a degradation function, and estimates the pre-degradation image (restored image) from the degraded shot image by the iteration method.

2. Description of the Related Art

Various techniques to restore the degradation of an image shot by a digital camera or the like have been proposed.

As such an image restoration method, one based on the iteration method using iterative calculations is known. According to this restoration method, image modification and update and image degradation by use of a degradation function are iterated, and the degraded image is compared with the shot image. When the residual obtained by the comparison is smaller than a predetermined threshold value, the corresponding updated image is estimated to be the restored image. The principle of this image restoration is described, for example, in a document "M. Elad and A. Feuer; Super-Resolution of an Image Sequence-Adaptive Filtering Approach; Technion-Israel Institute of Technology, Apr. 4, 1997."

However, when a shot image degraded by an asymmetric degrading filter is restored by use of iterative calculations as described in the above-mentioned document, the image restoration accuracy is low. In addition, many iterative calculations are required, so that the restoration requires much time.

The present invention is made in view of such a technical background, and an object thereof is to provide an image restoration apparatus capable of restoring a shot image degraded by an asymmetric degrading filter, in a short time with a high degree of accuracy.

SUMMARY OF THE INVENTION

The above-mentioned object is attained by an image restoration apparatus comprising: a corrector for correcting a shift of a shot image degraded at the time of shooting; a degraded image generator for generating a degraded image of the corrected shot image; a residual calculator for calculating a residual between the degraded image and the shot image; and a controller for determining whether the calculated residual is smaller than a predetermined threshold value or not, and for recording the degraded image as a restored image when the residual is smaller than the predetermined threshold value.

In this image restoration apparatus, a shift of the shot image degraded at the time of shooting is corrected, the corrected shot image is degraded and the residual between the degraded image and the shot image is calculated. When the residual is smaller than the predetermined threshold value, the corresponding degraded image is recorded as the restored image.

In the following description, like parts are designated by like reference numbers throughout the several drawings.

DETAILED DESCRIPTION OF THE PREFERRED EMBODIMENT

Hereinafter, an embodiment of the present invention will be described.

Figure 1:
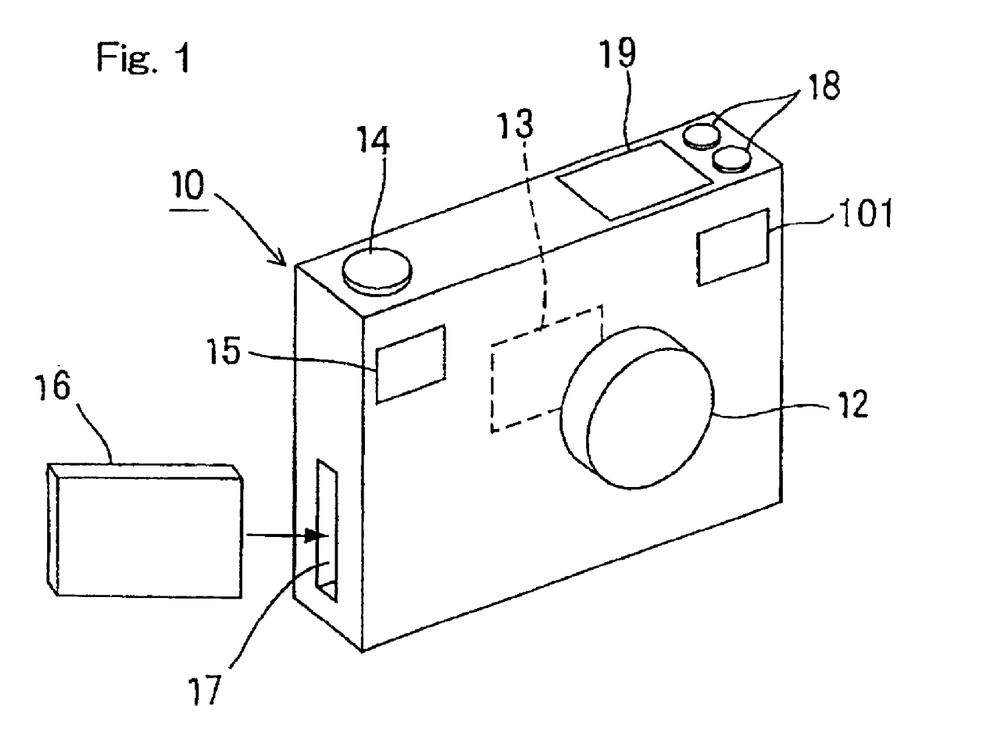
FIG. 1 is an external perspective view showing a digital camera to which an image restoration apparatus according to an embodiment of the present invention is applied.
Figure 2:
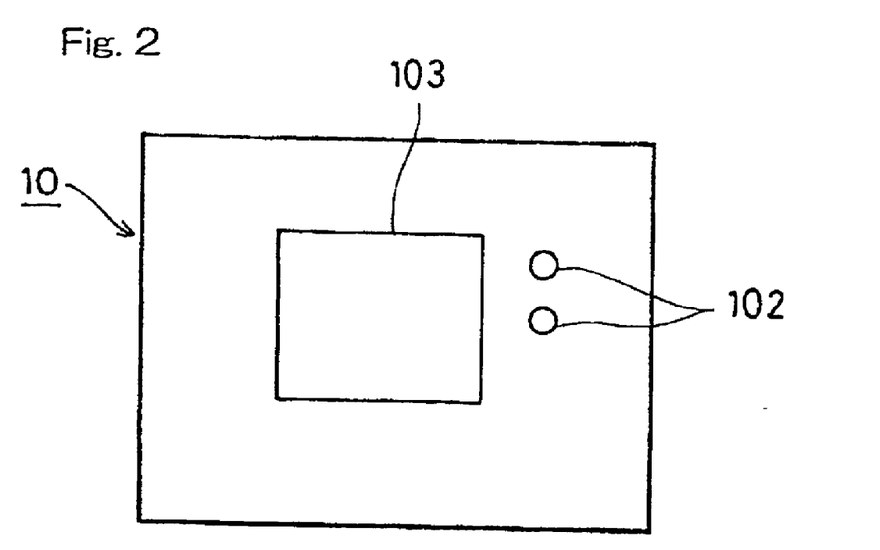
FIG. 2 is a rear view of the digital camera of FIG. 1.

FIGS. 1 and 2 show the embodiment in which an image restoration apparatus according to an embodiment of the present invention is applied to a digital camera.

FIG. 1 is an external perspective view of the digital camera. FIG. 2 is a rear view of the digital camera.

In FIGS. 1 and 2, on the front surface of the digital camera 10, a photographing lens 12, a finder window 15 and a distance measurement window 101 are provided. In the digital camera 10, a CCD 13 is disposed as an image sensing device that receives and photoelectrically converts an optical image formed by the photographing lens 12.

On the top surface of the digital camera 10, a release (shutter) button 14, shooting mode setting keys 18 and a liquid crystal panel 19 are provided. On a side surface of the digital camera 10, a slot 17 into which a recording medium 16 such as a memory card is removably insertable is provided.

The shooting mode setting keys 18 are used for the user to perform setting of the exposure condition such as aperture priority or shutter priority, switching to or from macro shooting and zoom setting while viewing the contents displayed on the liquid crystal panel 19.

On the back surface of the digital camera 10, as shown in FIG. 2, a liquid crystal monitor 103 for live view display and image processing setting keys 102 are provided. Like normal digital cameras, the digital camera 10 is capable of recording images shot by the CCD 13 onto the recording medium 16. In addition thereto, the digital camera 10 has an image restoration function. This function is for the digital camera 10 to automatically perform image restoration based on the obtained degradation function. It is to be noted that whether image restoration is necessary or not may be determined by the user by the image processing setting keys 102 before image restoration.

Figure 3:
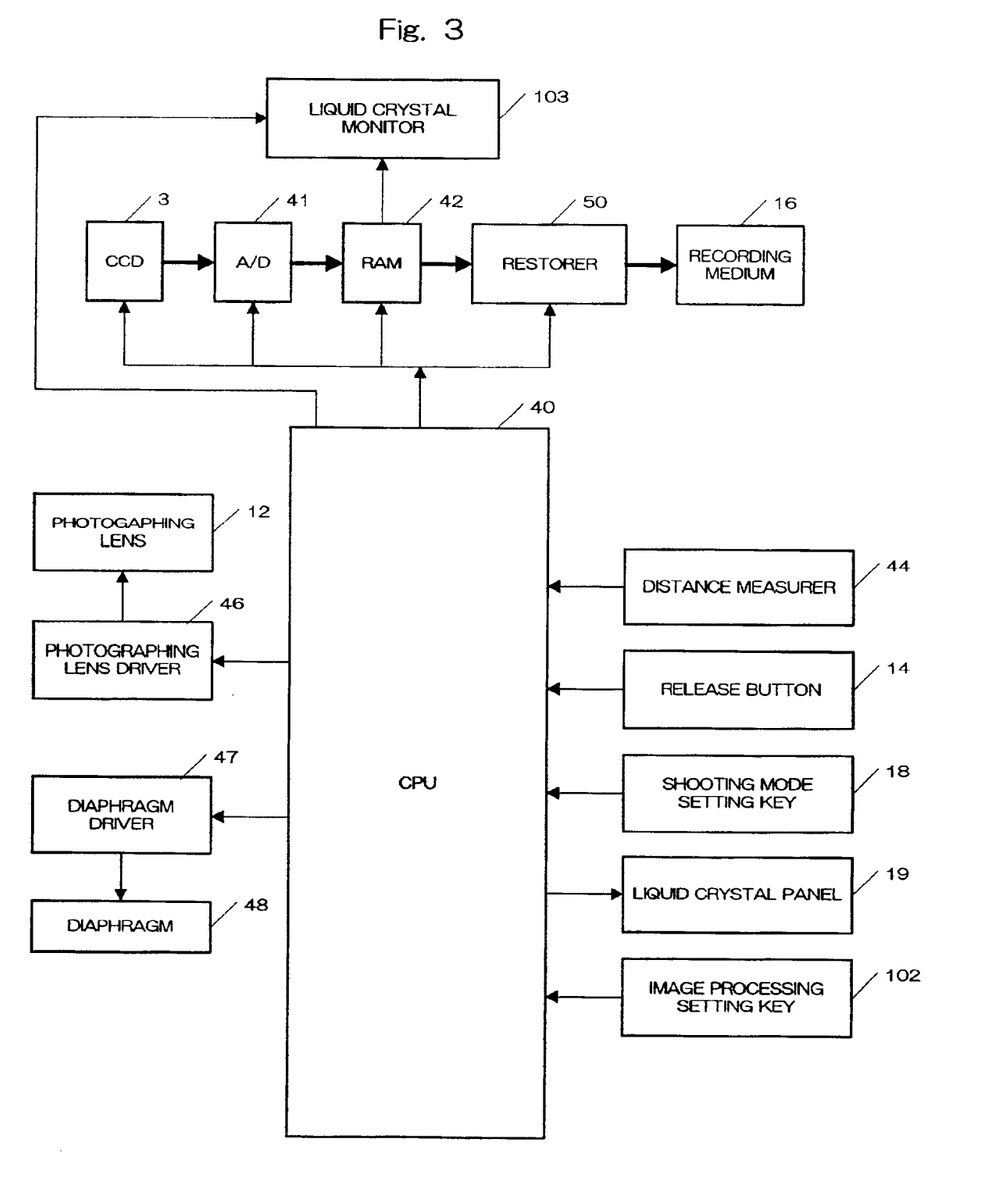
FIG. 3 is a block diagram showing the electric structure of the digital camera.

FIG. 3 is a block diagram of the digital camera 10. The thin arrows show the flow of control data. The thick arrows show the flow of image data.

Reference number 40 represents a CPU that stores the shooting condition when the shutter button 14 is depressed and the setting condition of the image processing setting keys 102, and displays the exposure condition on the liquid crystal panel 19. Further, the CPU 40 drives the photographing lens 12 so as to be focused on an appropriate subject through a shooting lens driver 46 based on the distance measurement result from a distance measurer 44. Moreover, the CPU 40 controls a diaphragm 48 through a diaphragm driver 47.

The analog image signal from the CCD 13 is converted to digital image data by an A/D converter 41, and is temporarily stored in an image memory (RAM) 42. The stored image data is displayed on the liquid crystal monitor 103 by the control by the CPU 40.

Reference number 50 represents an image restorer that restores shot images. The image restorer 50 restores the image stored in the RAM 42 when it is necessary to do so. Details of the image restoration will be described later.

When the image restoration is not performed, the CPU 40 stores the image read from the RAM 42 onto the recording medium 16. When the image restoration is performed, the CPU 40 stores the image restored by the image restorer onto the recording medium 16.

Figure 4:
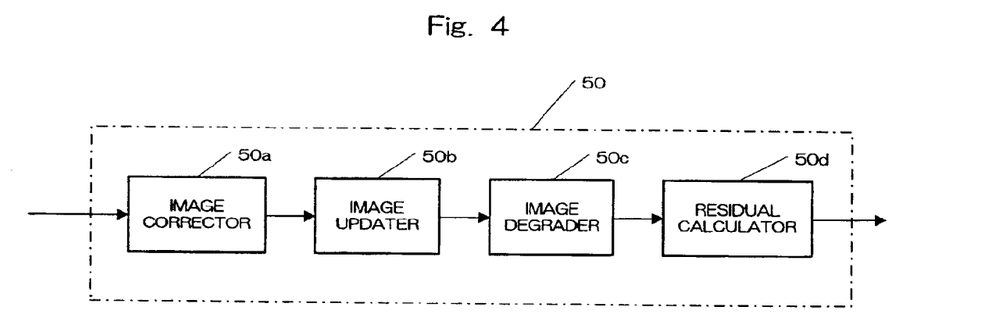
FIG. 4 is a block diagram showing the functional structure of an image restorer.

The image restorer 50 has, as shown in FIG. 4, an image corrector 50a, an image updater 50b, an image degrader 50c, and a residual calculator 50d.

When the shot image is degraded by an asymmetric degrading filter, the image corrector 50a makes an image shift correction on the shot image, and when necessary, performs edge enhancement filtering process on the corrected shot image to obtain an initial image. When the shot image is degraded by a symmetric degrading filter, the image corrector 50a sets the shot image as the initial image as it is without performing any processing thereon, or when necessary, performs edge enhancement filtering process to obtain the initial image.

The image updater 50b modifies the initial image into an updated image based on the degradation function obtained at the time of shooting, or when the iterative processing is iterated as described later, further modifies the modified image into an updated image.

The image degrader 50c degrades the image updated by the image updater 50b by use of the degradation function obtained at the time of shooting.

The residual calculator 50d calculates the residual between the degraded image and the shot image.

The CPU 40 determines whether the calculated residual is smaller than a predetermined threshold value or not. When the residual is not smaller, the CPU 40 supplies the updated image to the image updater 50b as a new image to be processed, and iterates the image modification and update by the image updater 50b, the image degradation by the image degrader 50c and the residual calculation by the residual calculator 50d until the residual is smaller than the predetermined threshold value. When the residual is smaller than the predetermined threshold value, the corresponding updated image is stored onto the recording medium 16 as the restored image.

Shooting and restoration by the digital camera 10 are performed in the following manner: First, the user selects aperture priority, shutter priority or the like with the shooting mode setting keys 18. Finishing the setting of the camera, the user recognizes a subject and depresses the release button 14. Then, the distance measurer 44 measures the subject distance. Then, based on the result of the distance measurement, the photographing lens 12 is driven so as to be focused on the subject through the photographing lens driver 46. Then, the diaphragm 48 is set at an appropriate value through the diaphragm driver 47. Then, charge accumulation by the CCD 13 is performed, and the image data is read out. The read image data is converted to digital data by the A/D converter 41 by a pipeline method, and is temporarily stored in the RAM 42.

Then, the image restoration is performed by the image restorer 50 by use of the shot image stored in the RAM 42.

Figure 5:
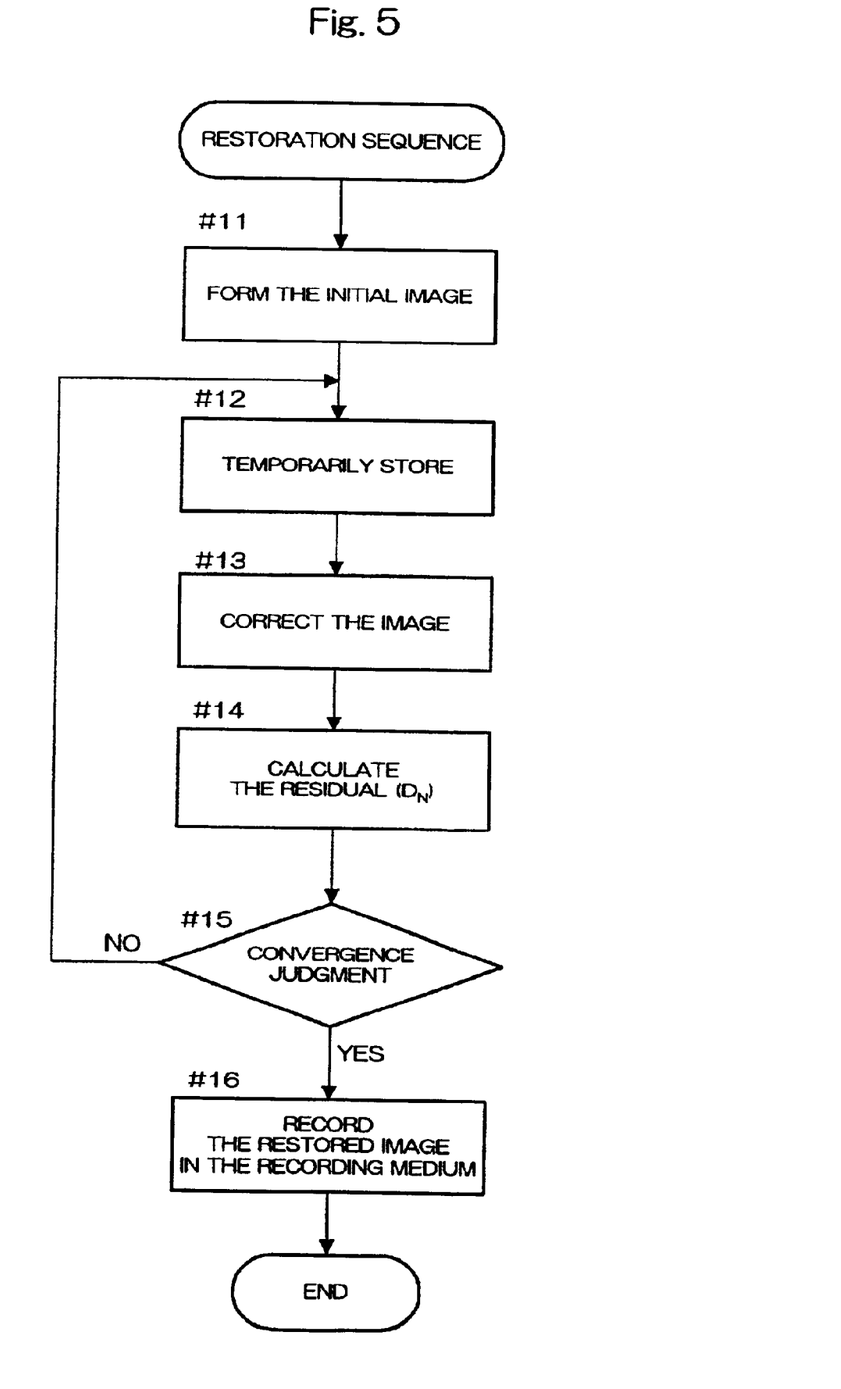
FIG. 5 is a flowchart of image restoration.

The contents of the image restoration are shown in the flowchart of FIG. 5. In the description that follows and the figure, steps are represented by #.

First, at #11, the image restorer 50 produces the initial image necessary for the image restoration from the shot image stored in the RAM 42 (hereinafter, sometimes referred to as picked image). Details of the method of producing the initial image will be described later.

After the initial image is produced, at #12, the initial image $X_0(i,j)$ is temporarily stored in the RAM 42.

Then, at #13, the image updater 50b makes an image modification based on the initial image $X_0(i,j)$ temporarily stored in the RAM 42, the degradation function H obtained at the time of shooting and the picked image $Y(i,j)$, and updates the initial image $X_0(i,j)$ to produce a new image (hereinafter, referred to as updated image) $X_1(i,j)$.

Then, at #14, the updated image $X_1(i,j)$ is degraded by use of the degradation function H obtained at the time of shooting, and the difference (residual $D_1$) from the picked image $Y(i,j)$ is calculated. Expressing this as an expression, $$D_0 = \sum_{i=1}^{M} \sum_{j=1}^{N} \|Y(i,j) - H \cdot X_n(i,j)\|^2 \qquad \text{[Expression 1]}$$

where n is the number of iterations (n=1, 2, ...); i and j are natural numbers; M is the number of pixels in a column; and N is the number of pixels in a row.

Then, at #15, the CPU 40 determines whether the following relationship holds with respect to the calculated residual $D_1$ or not (convergence determination):

$$D_n < K \qquad \text{[Expression 2]}$$

where K is a threshold value.

When the relationship of the expression 2 does not hold (the result of the convergence determination of #15 is NO), the process returns to #12, where the initial image $X_0(i,j)$ temporarily stored in the RAM 42 is deleted and the updated image $X_1(i,j)$ is temporarily stored in the RAM 42.

At #13, an image modification is made based on the updated image $X_1(i,j)$ temporarily stored in the RAM 42, the degradation function H obtained at the time of shooting and the picked image $Y(i,j)$, and the updated image $X_1(i,j)$ is updated to produce a new updated image $X_2(i,j)$.

Then, at #14, a residual $D_2$ is calculated from the updated image $X_2(i,j)$, the degradation function H and the picked image $Y(i,j)$, and with respect to the calculated residual $D_2$, the convergence determination of #15 is made.

When the result of the convergence determination of #15 is NO, the process returns to #12 and similar procedures are iterated until the result of the convergence determination is YES.

When the result of the convergence determination of #15 is YES, at #16, the updated image $X_{n-1}(i,j)$ stored in the RAM 42 is recorded onto the recording medium 16 as the restored image.

Next, the initial image production shown at #11 of FIG. 5 will be described in detail with reference to FIG. 6.

The degradation function obtained at the time of shooting can be expressed in the form of a two-dimensional filter (hereinafter, two-dimensional filter will be referred to as degrading filter). For example, in the case of a point image distribution function such as a Gaussian function, the degrading filter is expressed as FIG. 6(A). When a camera shake occurs in a horizontal direction, the degrading filter is expressed as FIG. 6(B). In the case of an optical low-pass filter used in an imaging system comprising one image sensing device where primary color (or complementary color) filters are arranged in the Bayer pattern, the degrading filter can be expressed as FIG. 6(C).

Figure 6A:
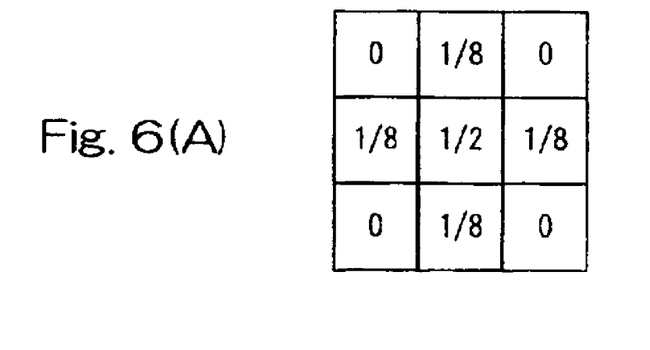
FIG. 6(A), FIG. 6(B) and FIG. 6(C) illustratively shows degrading filters.
Figure 6B:
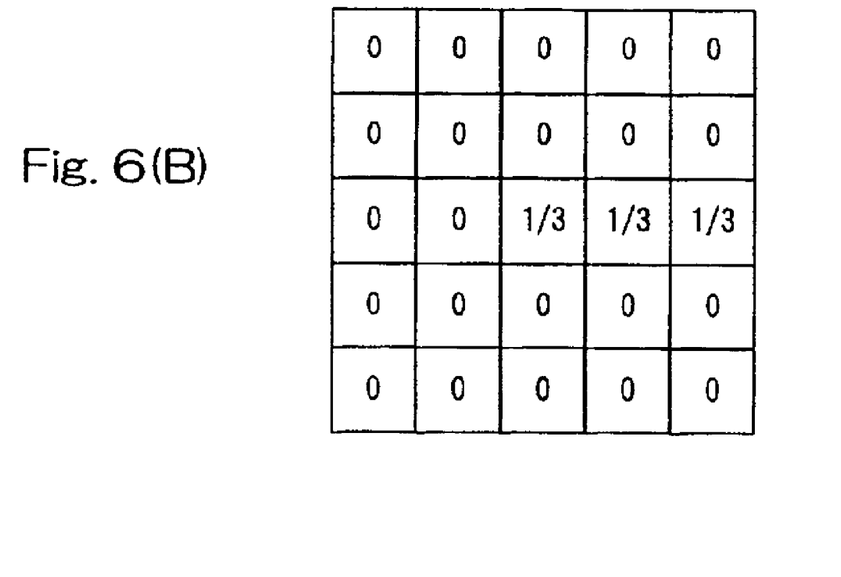
Figure 6C:
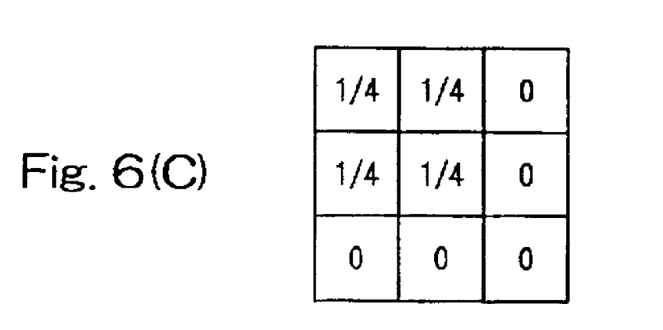
Figure 7A:
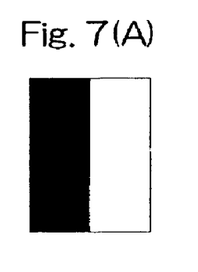
FIG. 7 show pixel conditions when a sharp edge is acted on by the degrading filters of FIG. 6.
Figure 7B:
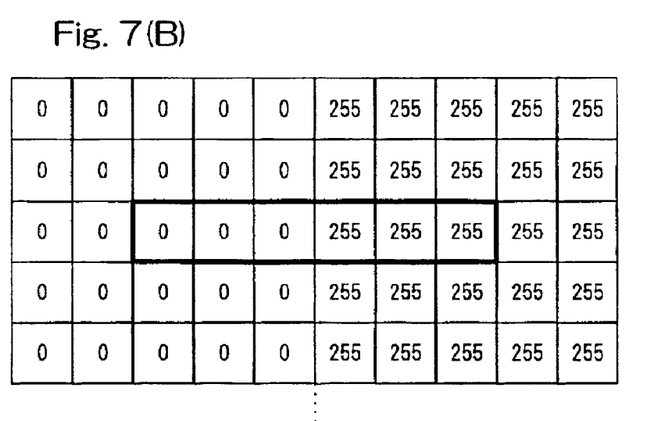

FIG. 7(A) is an image representative of a sharp edge. FIG. 7(B) shows the brightness distribution of FIG. 7(A). The brightness distribution conditions when FIG. 7(B) is acted on by the three kinds of degrading filters shown in FIGS. 6(A), 6(B) and 6(C) are expressed as FIGS. 7(C), 7(D) and 7(F).

Figure 7C:
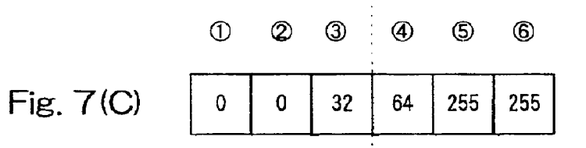

In the case of a symmetric degrading filter having a symmetric configuration like FIG. 6(A), it is apparent that like FIG. 7(C), both sides of the part of the sharp edge of the pre-degradation image are affected by degradation. That is, no image shift is caused by the degradation by a symmetric degrading filter like FIG. 6(A).

Figure 7D:
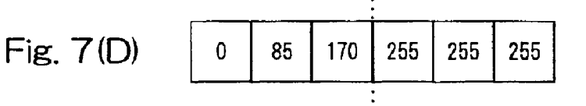
Figure 7E:
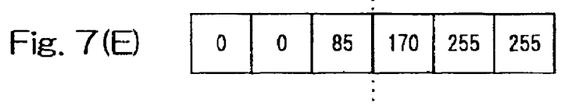
Figure 7F:
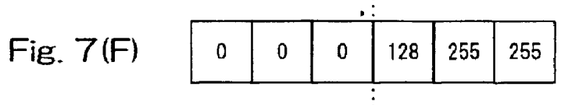

On the contrary, in the case of an asymmetric degrading filter having an asymmetric configuration like FIG. 6(B) or FIG. 6(C), it is apparent that like FIG. 7(D), only the left side of the part of the sharp edge of the pre-degradation image is affected by the degradation, or that like FIG. 7(F), only the right side of the part of the sharp edge of the pre-degradation image is affected by the degradation. This is because a slight image shift is caused by the degradation by an asymmetric degrading filter like FIG. 6(B) or FIG. 6(C).

Considering these, the initial image producing method will be described with respect to both the symmetric degrading filter and the asymmetric degrading filter.

When the initial image is produced from a picked image degraded by a symmetric degrading filter, since it is unnecessary to consider an image shift, the initial image is produced merely by performing edge enhancement filtering process on the picked image. Alternatively, the picked image may be used as the initial image as it is without any processing performed.

When the initial image is produced from a picked image degraded by an asymmetric degrading filter, since an image shift has occurred, first, an image shift correction is made by the image corrector 50a. For example, in the case of the degrading filter of FIG. 6(B), since it is desirable that the pre-degradation sharp edge part be situated between ② and ③ of FIG. 7(D), the image shift correction is made by shifting the image rightward one pixel at a time as shown in FIG. 7(E).

Figure 7G:
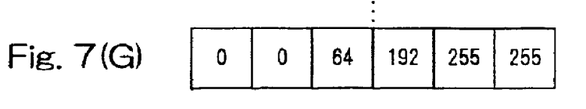

In the case of the degrading filter of FIG. 6(C), since it is desirable that the pre-degradation sharp edge part be situated on ④ of FIG. 7(F), the image shift correction is made by shifting the image leftward 0.5 pixel at a time. However, since it is physically impossible to shift images by 0.5 pixel, the image shift correction is made by obtaining the average of the adjoining pixels instead. In this example, by setting the average of ① and ② as ①, setting the average of ② and ③ as ② and similarly performing the calculation on the succeeding pixels, FIG. 7(G) is obtained. By this method, a shift-corrected image is obtained from a picked image degraded by any asymmetric degrading filter.

After the image shift correction is finished, the initial image may be produced by performing filtering process for edge enhancement on the picked image like in the case of the symmetric degrading filter. Alternatively, the shift-corrected image may be used as the initial image without the filtering processing performed.

Next, the difference in image restoration between when the image shift correction is made and when the image shift restoration is not made in a case where the initial image is produced from a picked image degraded by the asymmetric degrading filter will be described with reference to FIGS. 8(A) and 8(B).

Figure 8A:
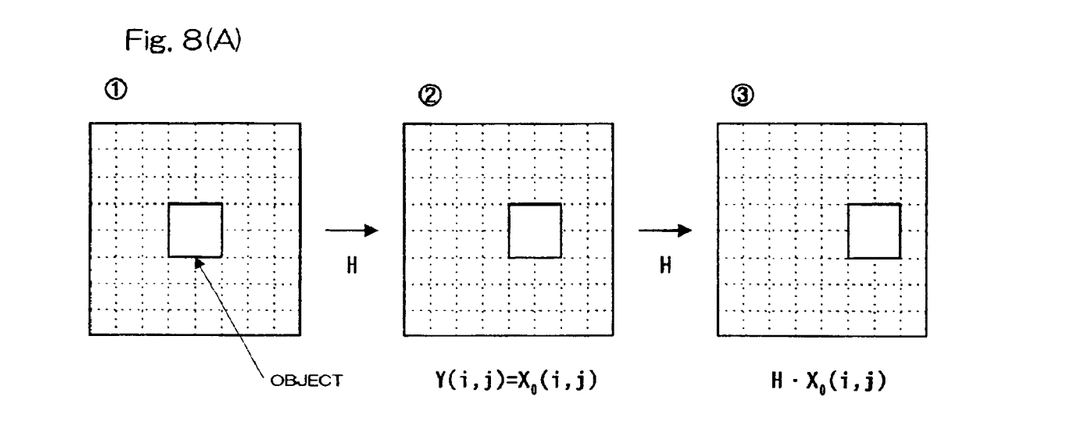
FIG. 8(A) and FIG. 8(B) are views for explaining the difference between when an image shift correction is made and when no image shift correction is made.

FIG. 8(A) is a simplified view in the case where the image shift correction is not made. FIG. 8(B) is a simplified view in the case where the image shift correction is made. In these figures, ① represents an image to be shot, and an object is present in the center of the image. When the image is asymmetrically degraded at the time of shooting, the object in the center of the image slightly shifts as shown in ② of the figures.

When the image shift correction is not made, since the picked image is used as the initial image as it is, the part of H·Xn(i,j) at the time of the residual calculation shown in the expression 1 further shifts as shown in ③ of FIG. 8(A). That is, when the difference between ②(Y(ij)) of FIG. 8(A) and ③ (H·Xn(i,j)) of FIG. 8(A) is obtained, the residual at the time of the first iteration increases due to the shift of the object, so that the calculation for satisfying the desired convergence determination takes much time. Consequently, it is difficult to produce a more accurate restored image.

Figure 8B:
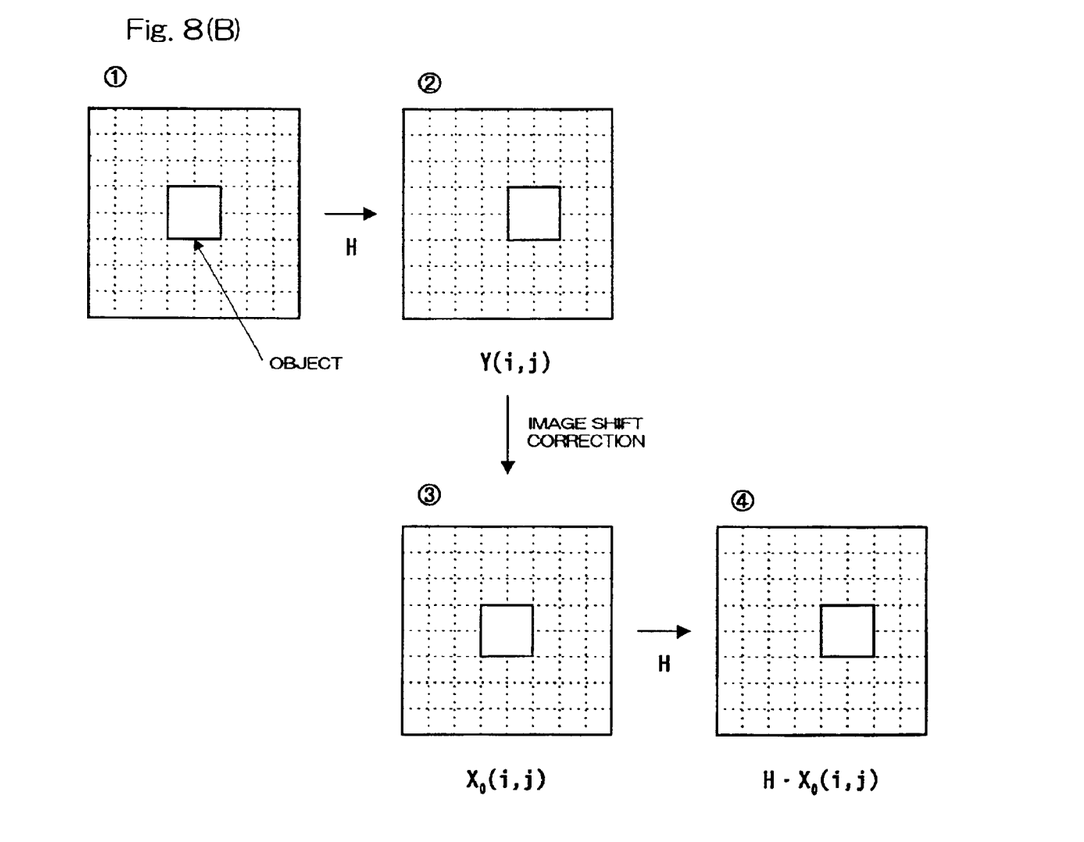

Conversely, when the image shift correction is made, since the initial image is produced by making the image shift correction as shown in ③ of FIG. 8(B), the shift of the part of H·Xn(i,j) of the residual calculation of the expression 1 from ② of FIG. 8(B) is suppressed as shown in ④ of FIG. 8(B). That is, when the difference between ②(Y(i,j)) of FIG. 8(B) and ④(H·Xn(i,j)) of FIG. 8(B) is obtained, the residual at the time of the first processing is small because there is no object shift. This reduces the time for the calculation for satisfying the desired convergence determination, so that a highly accurate restored image can be produced.

While the image restoration is performed by the digital camera 10 in the description given above, an image shot by a digital camera or the like may be restored by an external apparatus such as a computer. In this case, the program of FIG. 5 is read into a computer through a network or a recording medium, and is executed on the computer.

According to the image restoration apparatus of the present invention, since a shot image degraded by an asymmetric degrading filter in which an image shift is corrected is used as the initial image, it is necessary to iterate the image modification and update, the image degradation and the residual calculation only a small number of times, so that the restoration can be performed in a short time and the restoration accuracy can be improved.

Although the present invention has been fully described by way of examples with reference to the accompanying drawings, it is to be noted that various change and such changes and modifications depart from the scope of the present invention, they should be construed as being included therein.

What is claimed is:

1. An image restoration apparatus comprising:
   a corrector for correcting a shift of a shot image degraded at the time of shooting;
   a degraded image generator for generating a degraded image of the corrected shot image;
   a residual calculator for calculating a residual between the degraded image and the shot image; and
   a controller for determining whether the calculated residual is smaller than a predetermined threshold value or not, and for recording the corrected shot image as a restored image if the residual is smaller than the predetermined threshold value.

2. An image restoration apparatus according to claim 1, wherein said shot image is degraded by an asymmetric degrading filter.

3. An image restoration apparatus according to claim 1, wherein said degraded image generator generates the degraded image of the shot image by use of degradation function obtained at a time of shooting.

4. An image restoration apparatus according to claim 1, wherein said degraded image generator and said residual calculator are executed repeatedly until the calculated residual is smaller than the predetermined threshold value.

5. An image restoration apparatus according to claim 1, wherein said corrector corrects the shift of the shot image by obtaining the average of the adjoining pixels.

6. An image restoration apparatus according to claim 1, wherein said corrector is not executed when the shot image has been degraded by an asymmetric degrading filter.

7. An image restoration apparatus according to claim 1, further comprising an initial image generator for generating an initial image by performing edge enhancement filtering process on the shot image, and wherein said corrector corrects the shift of the initial image.

8. An image restoration apparatus according to claim 1, wherein said image restoration apparatus is a digital camera.

9. An image restoration apparatus comprising:
a corrector for correcting a shift of a shot image degraded by an asymmetric degrading filter;
an updater for performing image modification and update with the corrected shot image as an initial image;
a degraded image generator for generating a degraded image of the updated image by use of a degradation function obtained at a time of shooting;
a residual calculator for calculating a residual between the degraded updated image and the shot image; and
a controller for determining whether the calculated residual is smaller than a predetermined threshold value or not, and when the residual is not smaller than the predetermined threshold value, with the updated image as a new image to be processed, for iterating the image modification and updating by the updater, the image degradation by the degraded image generator and the residual calculation by the residual calculator until the residual is smaller than the predetermined threshold value.

10. A computer program product containing a program stored on a computer readable medium for executing an image restoring, in which execution of said program by a computer allows said computer to execute the steps of:
correcting a shift of a shot image degraded by an asymmetric degrading filter;
generating a degraded image of the corrected shot image;
calculating a residual between the degraded image and the shot image;
determining whether the calculated residual is smaller than a predetermined threshold value or not; and
recording the corrected shot image as a restored image if the residual is smaller than the predetermined threshold value.

* * * * *

UNITED STATES PATENT AND TRADEMARK OFFICE
CERTIFICATE OF CORRECTION

| | |
|---|---|
| PATENT NO. | : 7,031,544 B2 |
| APPLICATION NO. | : 10/108135 |
| DATED | : April 18, 2006 |
| INVENTOR(S) | : Hironori Sumitomo et al. |

It is certified that error appears in the above-identified patent and that said Letters Patent is hereby corrected as shown below:

Drawing sheet, consisting of Fig. 3, should be deleted and replaced with the drawing sheet, consisting of Fig. 3, as shown on the attached page.

Column 7:
Line 3, delete "of degradation" and insert -- of a degradation --.

Signed and Sealed this

Tenth Day of October, 2006

JON W. DUDAS
*Director of the United States Patent and Trademark Office*

Fig. 3